INVENTORS
SAMUEL FINE
CHARLES F. HENDEE
BY
*Frank R. Trifari*
AGENT

INVENTORS
SAMUEL FINE
BY CHARLES F. HENDEE
AGENT

United States Patent Office 2,982,814
Patented May 2, 1961

2,982,814

APPARATUS FOR DETERMINING THE COMPOSITION AND CONDITION OF A SPECIMEN OF MATERIAL

Samuel Fine, New York, and Charles F. Hendee, Hartsdale, N.Y., assignors to North American Philips Company, Inc., New York, N.Y., a corporation of Delaware Filed Feb. 14, 1958, Ser. No. 715,392

7 Claims. (Cl. 178—6.8)

The present invention relates to apparatus for determining the composition and condition of a specimen of material. More particularly, the present invention relates to apparatus for producing a visual color pattern of the surface disposition of a specimen of material thereby indicating the kinds, quantities, and positions of elements for which the specimen is tested.

An object of the present invention is the provision of apparatus for visually indicating the surface composition and condition of a specimen.

Another object of the invention is the provision of apparatus for producing a multichromatic visual indication of the surface composition and condition of a specimen.

These and other objects and features of the invention will be apparent from a consideration of the following detailed description taken in connection with the accompanying drawing, wherein.

Figure 1:
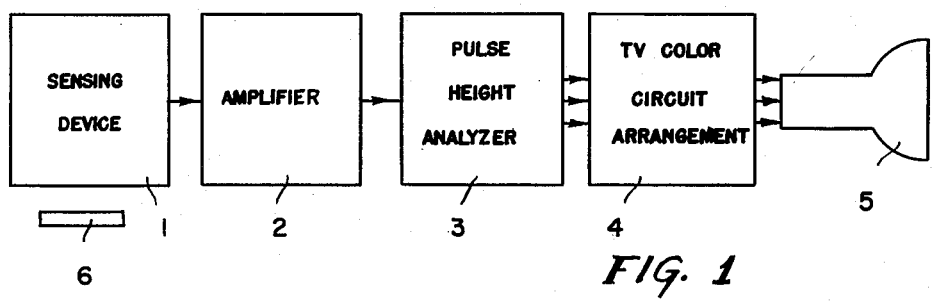
Fig. 1 is a schematic block diagram of an embodiment of the apparatus of the present invention.
Figure 3:
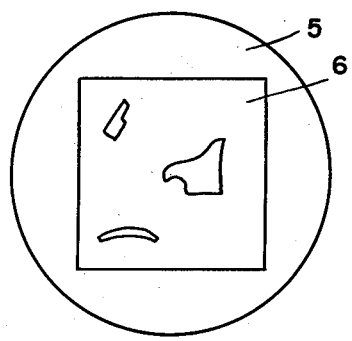
Figure 4:
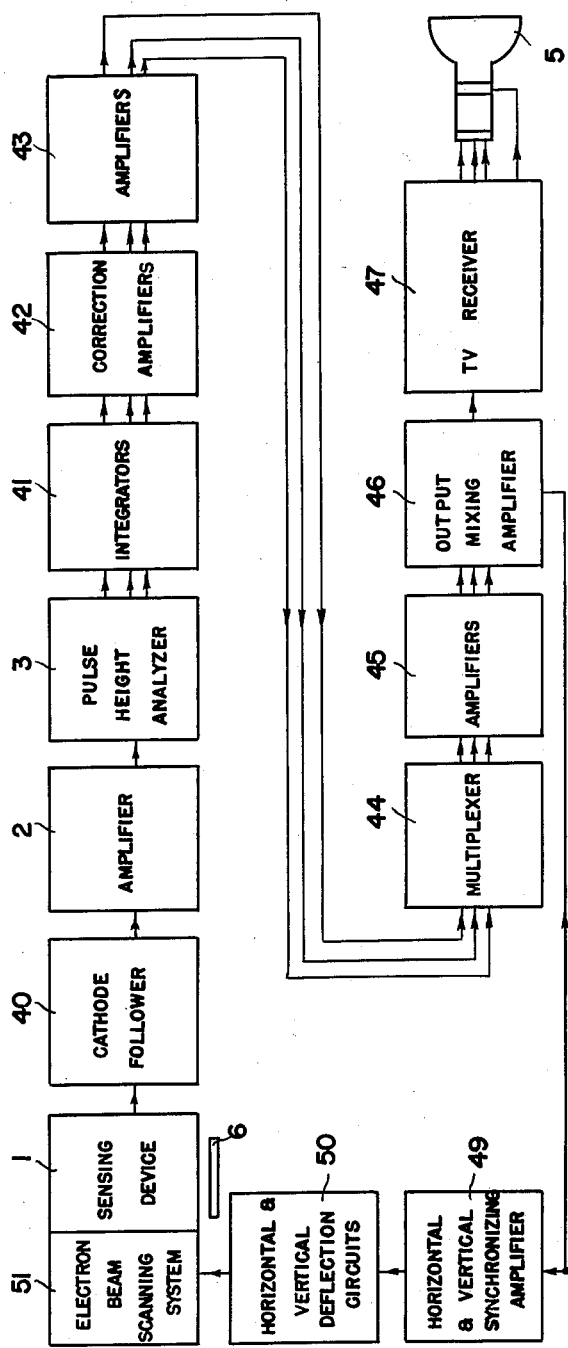

Fig. 3 is a face view of the visual indicating unit 5 of the apparatus of Fig. 1; and Fig. 4 is a schematic block diagram of an embodiment of a circuit arrangement which may be utilized as the amplifier 2, the pulse height analyzer 3 and the TV color circuits 4 of the apparatus of Fig. 1.

In operation of the apparatus of the present invention, the surface of a specimen 6 is preferably scanned by a fine spot electron beam at a slow sweep and repetition rate. When the electron beam is accelerated through a potential drop in volts greater than the K absorption energy in electron volts of the highest atomic numbered element in the specimen, then all the elements in the specimen will fluoresce with the emission of the characteristic K and L X-rays for each of the elements. An energy-sensitive proportional X-ray detector, proportional counter, or sensing device 1, placed in juxtaposition to the sample, will absorb the X-radiations and consequently produce an output comprising groups of electrical pulses whose mean amplitudes are proportional to the photon energies of the radiation absorbed. The number of pulses per second in each group of pulses produced by the sensing device 1 is proportional to the quantity of each element present. Thus, if there are three elements in the specimen, the sensing device 1 will absorb three different K X-radiation energies and will produce three groups of electrical pulses of differing amplitudes. As the electron beam scans over the surface of the specimen 6 in space and time, there may be variations in the composition of said surface for each minute area of the surface covered by the beam. The number of electrical pulses per second at the detector 1 output in each group of pulses will have a time variation corresponding to the time sequence in which the minute areas are scanned. The time variation is indicative of change of composition along the succession of the areas.

For the purpose of illustrating the operation of the apparatus of the present invention, it may be assumed that the specimen 6 is tested for three preselected elements. For three elements in the specimen 6, there will be three time-varying groups of pulses at the output of the sensing device 1. The sensing device 1 feeds a pulse height analyzer 3 through an amplifier 2. By means of the pulse height analyzer 3, which is preferably a multichannel (three channel) pulse height analyzer, the time-varying groups of pulses produced by the sensing device 1 may be separated out into three discrete and separate outputs each of which is still time-varying. In the preferred embodiment of the invention, the analyzer 3 outputs, designated red, green and blue, are integrated and become the modulating signals in the red, green and blue channels of a color TV transmitting system. The outputs of the pulse height analyzer 3, after transmission, are received by a color TV receiver and are applied to a visual indicating unit 5. If the sweep and repetition rate of the visual indicating unit or receiver kinescope 5 beam and the electron scanning beam in the sensing device 1 are synchronized, said visual indicating unit or receiving kinescope, connected to the transmitter by a closed or open system, will display the surface of the specimen 6 in multichromatic hues. The presence of pure primary color in the display represents the presence of pure element at the corresponding place in the specimen 6; the presence of other colors and their brightness represents the mixture and composition of a number of elements at the corresponding place in the specimen; black representing the absence of elements which the system is set up to analyze. By the use of standard specimens, whose surface composition and structure have been studied by techniques in other arts, it becomes possible to correlate the color display to surface condition. Thus, the use of standard specimens with the apparatus may be a means for training an observer to operate the system and in effect establishes a means for making calibration displays with standard samples.

This system, as described, can show, to a trained observer, the surface condition, such as composition, cracks, cavities, agglomerations, phase identification, diffusion phenomena, intergranular corrosion, precipitation, embrittlement, plating thickness, oxide layer formation, and interlayer alloying, by means of a multichromatic image. The system is in effect a proportional counter microscope due to the magnification ratio between the visual indicating unit or kinescope 5 viewing area and the surface area of the specimen 6. The system is capable of dynamic representation of the specimen surface if provision is made for changing the environment of the specimen, for example, by changing temperature, by subjecting the specimen to compression, tension, or torsion, or to electric or magnetic fields.

Figure 2:
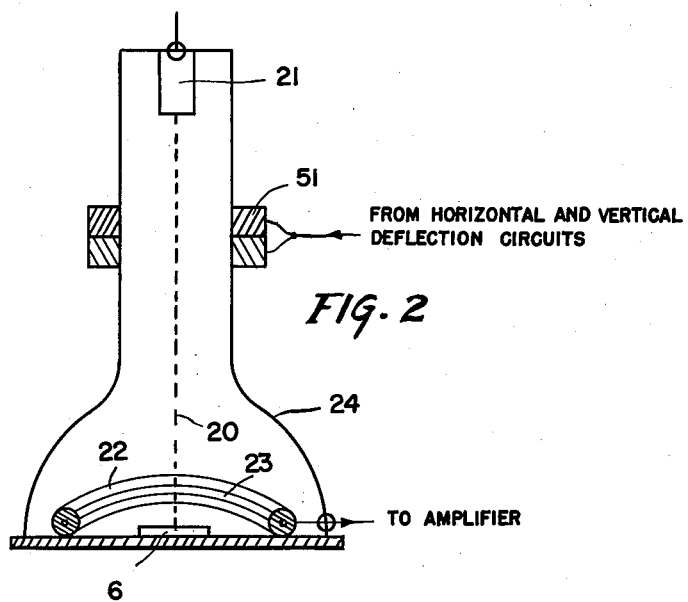
Fig. 2 is a cross-sectional schematic diagram of an embodiment of apparatus which may be utilized as the sensing device 1 of the apparatus of Fig. 1.

The sensing device 1 of Fig. 2 comprises means for slowly scanning the surface of the specimen 6 with impinging electrons 20 from a micro-focus electron beam forming and focussing assembly 21. The impinging electrons produce fluorescent X-radiation varying in energy and intensity in accordance with the surface composition and condition of the specimen 6. That is, the energy of the X-radiations varies in various ranges depending on the elements on which the beam impinges as it scans and the intensity in each of the ranges varies with the quantitative proportions of the corresponding elements present at that point in the specimen.

The lower portion of the sensing device 1 may comprise any suitable energy-sensitive proportional detector, such as, for example, a toroidal proportional counter 22 positioned so that it forms a ring around the specimen 6 and with a slit-shaped window 23 facing the specimen around the inner periphery of the counter. The inner periphery window is transparent to the lowest energy X-radiation emitted from the specimen. Mechanically, the toroidal counter 22 may be a separate assembly which is placed within the sensing device 1 housing 24 or may be fabricated integrally with said housing.

Other energy-sensitive proportional detectors, such as, for example, scintillation crystal-photomultiplier combinations or crystal counters may be used in place of the toroidal ring type counter 22 described above. If so, the geometric distribution of the detectors around the sample may not be of the continuous ring type, but may consist of a single detector or a number of such detectors equispaced on the circumference of a circle around the specimen. The volume in the sensing device 1 within which the electron beam 20 is generated, focussed, accelerated and scanned, and within which the surface of specimen 6 is exposed to said beam, must be at high vacuum. This may require that the entire volume be continuously pumped and that a cathode be used which is insensitive to exposure to air when cold. Or, as is done in some electron microscopes, an air lock may be provided for specimen insertion, necessitating pumping only of the air lock chamber.

Fig. 4 is an embodiment of a circuit arrangement which may be utilized as the complete system of the present invention. In order that enough information may be detected by the sensing device 1 at each point of scan, the scanning beam 20 (shown in Fig. 2) should be of the highest intensity consistent with ability to fine focus and dissipated power in the specimen 6 and should slowly scan the specimen. Such a slow sweep and low repetition rate TV system for closed circuit use is described in an article entitled "Slow-Sweep TV for Closed-Circuit Use," by H. E. Ennes, appearing in Electronics magazine for November 1956, published by the McGraw-Hill Publishing Co., Inc., of New York City, pages 140–143. The output of the proportional counter or counters 22 (shown in Fig. 2) of the sensing device 1 is a series of groups of electrical pulses which vary in mean amplitude in accordance with the energy of the fluorescent characteristic X-radiation emitted by each element at the point of scan. The number of pulses in each group vary in accordance with the intensity of the fluorescent radiations. The pulses produced by the sensing device 1 are supplied through a cathode follower 40, which functions as an impedance matching device between the sensing device 1 and the input of the amplifier 2, to the amplifier 2 where they are amplified and supplied to the pulse height analyzer 3. The amplifier 2 raises the signal pulse amplitudes from the order of millivolts to the order of tens and hundreds of volts and the pulse height analyzer, preferably a multichannel pulse height analyzer, sorts out the pulses of the output of the amplifier 2 into groups of pulses, each with a minimum and maximum amplitude. Instead of a multichannel pulse height analyzer, a plurality of single channel pulse height analyzers may be utilized as the pulse height analyzer 3. The number of pulse height analyzer channels should correspond to the number of elements for which the specimen 6 is tested. Thus, if the specimen 6 is tested for three elements, the output of each channel, designated red, green and blue signals respectively, of the pulse height analyzer 3 comprises pulses uniform in amplitude, the number of pulses per second being proportional to the quantitative proportion of the element assigned to that channel at some instantaneous time and place on the surface of the specimen 6 as the electron beam 20 scans over it. Therefore, the output of the pulse height analyzer 3 is a plurality of series of pulses; the pulses of each series of pulses varying in rate with time in accordance with the variations of composition of the surface of the specimen along the path of scan by the electron beam.

The respective outputs of the pulse height analyzer 3 are integrated in red, green and blue channel integrators 41 which function as converters of pulse rate into signal currents. The outputs of the integrators 41 are fed to a TV compatible color transmitting system comprising, for example, correction amplifiers 42, amplifiers 43, a multiplexer 44, amplifiers 45 and an output mixing amplifier 46. The outputs of the integrators 41 are fed into correction amplifiers 42 which provide a number (three, in the example selected) of signal voltages in such a ratio to each other that their combination would produce a color (including white and grays) of a particular brightness, hue and saturation for a predetermined combination of elements at the point of scan.

The outputs of the correction amplifiers 42 are supplied to amplifiers or gamma correctors 43 which take approximately the square root of the output signals from the amplifiers 42 in order to compensate for the behavior of the picture tube phosphors whose light output is proportional to the square of the signal voltage impressed on their grids. The outputs of the amplifiers 43 are supplied to a multiplexer 44 which processes the outputs of the amplifiers 43 into one luminance signal (brightness) called Y and two chrominance signals (color information) called I for orange to cyan and Q for yellowish green to purple. The outputs of the amplifiers 43 are fed into a luminance channel of multiplexer 44 where they generate the luminance signal Y. The outputs of the amplifiers 43 are also fed into a chrominance channel of multiplexer 44 where they generate the chrominance signals I and Q. The Y signal is transmitted as a regular amplitude modulation of the video carrier signal; the I and Q signals each modulate a subcarrier which is itself a modulation component of the video carrier signal. The subcarrier modulated I and Q signals and the Y signal produced by the multiplexer 44 are amplified in amplifiers 45 and mixed in an output mixing amplifier 46. Thus, in each of the red, green and blue channels, the respective pulse height analyzer output is integrated, corrected for a particular brightness hue and saturation for a preselected combination of elements being analyzed and corrected for viewing tube phosphor response, added in proper proportion, amplified, modulated, and transmitted.

Synchronizing and blanking pulses are supplied to the output mixing amplifier 46 from a source of synchronizing and blanking pulses 48. The synchronizing and blanking pulses produced by the source 48 are supplied to an electron beam scanning system 51 through a horizontal and vertical synchronizing amplifier 49 and horizontal and vertical deflection circuits 50. The units 48, 49, 50 and 51 may comprise any known type of suitable circuit arrangement for producing synchronizing signals which synchronize the electron beam scan in unit 51 with electron scan in unit 5, such as, for example, that shown and described in Zworykin and Morton, "Television," 2nd Edition, published by John Wiley and Sons, Inc. of New York City, in 1954, pages 541 to 602. The electron beam scanning system 51 may comprise a portion of the sensing device 1 positioned outside the housing 24, as shown in Fig. 2.

The transmitted color and brightness signals produced by the TV transmission system are supplied to a TV receiver circuit 47 which serves to decode the information contained in the luminance Y signal and the chrominance I and Q signals and provide synchronized red, green and blue signals to the receiver color kinescope.

Although the embodiment illustrated is an open circuit compatible color system, other embodiments of the invention may utilize field sequential color TV systems and closed circuit industrial type TV systems.

The component portions 40, 2, 3, 41, 42, 43, 44, 45, 46 and 47 may comprise any known circuit arrangements of types suitable for the purposes of the present invention. Thus, for example, the cathode follower arrangement 40 may comprise that shown and described in an article entitled, "Nonblocking Double-Line Linear Pulse Amplifier," by E. Fairstein, appearing in Review of Scientific Instruments magazine, vol. 27, 1956, pages 475 to 482, Fig. 3; the amplifier 2 may comprise, for example, that described and shown in the same article on page 478. The pulse height analyzer 3 may comprise, for example, the multichannel type described and shown in an article entitled, "A Comprehensive Counting System for Nuclear Physics Research," by Moody, Battell, Howell and Taplin, appearing in Review of Scientific Instruments magazine, vol. 22, 1951, pages 555 to 563, or a plurality of the single channel types described and shown in an article entitled, "A Sweep-Type Differential and Integral Discriminator," by E. Fairstein, appearing in the same magazine, pages 761 to 764 (Fig. 1).

The integrators 41 may comprise, for example, those shown and described in Moskowitz and Racker, "Pulse Techniques," published by Prentice-Hall, Inc., of New York City, 1951, page 219, Fig. 7.7. The TV compatible color transmitting system may comprise, for example, that conforming to the standards established by the National Television System Committee and the Federal Communications Commission, and described and shown in Fink, "Television Engineering," 2nd Edition, published by the McGraw-Hill Book Company, Inc., of New York City, 1952, pages 537 to 549, in Hazeltine Corporation Laboratory Staff, "Principles of Color Television," edited by McIlwain and Dean, published by John Wiley and Sons, Inc., of New York City, 1956, pages 257 to 284, and in Wentworth, "Color Television Engineering," published by the McGraw-Hill Book Company, Inc., of New York City, 1955, pages 437 to 448.

The correction amplifiers 42 may comprise, for example, those shown in an article entitled, "Generation of NTSC Color Signals," by Fisher, appearing in Proceedings of the I.R.E., vol. 41, 1953, pages 338 to 343, Fig. 6. The amplifiers 43 may comprise, for example, those shown in an article entitled, "A Rooter for Video Signals," by Oliver, appearing in Proceedings of the I.R.E., vol. 38, 1950, pages 1301 to 1305, Fig. 4. The multiplexer 44 may comprise, for example, that shown in an article entitled, "Transmitting Terminal Apparatus for NTSC Color Television," by P. Burr, appearing in Transactions of the A.I.E.E., Part I, Communication and Electronics, vol. 72, 1953, pages 26 to 32, Figs. 3, 5, 7, 8, 9, and in Zworykin and Morton, "Television," 2nd Edition, published by John Wiley and Sons, Inc., of New York City, 1954, pages 883 to 886.

Other TV transmitting systems which may be utilized in the system of the present invention, may comprise, for example, the RCA TT-5A, General Electric TT-10A or Dumont 8000 type, shown and described in Zworykin and Morton, "Television," 2nd Edition, published by John Wiley and Sons, Inc., of New York city, in 1954, pages 609 to 614, Figs. 15.3a, 15.3b, 15.3c.

TV receivers which may be utilized in the system of the present invention, may comprise, for example, that shown and described in Kaufman and Thomas, "Introduction to Color TV," 2nd Edition, published by John F. Rider Publisher, Inc., of New York City, 1956, page 86, or that shown and described in an article entitled, "Compatible Color TV Receiver," by K. E. Farr, appearing in Electronics magazine for January, 1953, vol. 26, published by the McGraw-Hill Publishing Company, Inc., of New York City, page 98.

It is thus seen that the TV color circuit arrangement 4 and the visual indicating unit 5 cooperate to provide a multichromatic visual representation of the surface of the specimen 6 wherein the presentation of the colors of the surface of visual representation is in accordance with the integrated and instantaneous pulse rate in each series as integrated and supplied to the unit 4. Each output of each series produced by the pulse height analyzer 3 is applied to the TV color circuits 4 to control a separate primary color channel, so that each element for which the specimen 6 is tested is indicated as a separate primary color on the face of the unit 5, and other colors and their brightness represent combinations of elements and their composition. Thus, a color pattern dependent upon the composition and condition of the specimen appears on the face of the unit 5, as shown in Figure 3, thereby indicating the quantities and positions of elements for which the specimen is tested.

A long persistence set of phosphors in the visual indicating unit or display tube 5 must be used with the slow scan system. If the electron beam diameter is .001 inch, a specimen .250 inch in height could be scanned over by 250 lines. The display tube phosphor decay time requires that in this case each full picture be displayed in 6 seconds (repetition rate), making the horizontal frequency about 40 cycles per second. If the standard 3 by 4 aspect ratio is used the length of the sample will be .333 inch and the horizontal scan speed will be about 13 inches per second.

While the invention has been described by means of a specific example and in specific embodiments, we do not wish to be limited thereto, for obvious modifications will occur to those skilled in the art without departing from the spirit and scope of the invention.

What we claim is:

1. A circuit arrangement for determining the quantities and positions of selected elements in a specimen, comprising means for scanning the surface of said specimen with impinging electrons to produce fluorescent X-radiations varying in intensity and energy as the surface disposition of said specimen, means for providing a multichromatic visual representation of the surface of said specimen, and means for presenting the colors of said visual representation in accordance with the intensities and energies of said X-radiations to produce a color pattern dependent upon the surface disposition of said specimen thereby indicating the quantities and positions of said elements in the said specimen.

2. A circuit arrangement for determining the quantities and positions of selected elements in a specimen, comprising means for scanning the surface of said specimen with impinging electrons to produce fluorescent X-radiations varying in intensity and energy as the surface disposition of said specimen, means for producing from said X-radiations electrical pulses having magnitudes dependent upon the energies of said X-radiations, means for providing a multichromatic visual representation of the surface of said specimen, and means for presenting the colors of said visual representation in accordance with the magnitudes of said pulses thereby to produce a color pattern dependent upon the surface disposition of said specimen indicating the quantities and positions of said elements in the said specimen.

3. A circuit arrangement for determining the quantities and positions of selected elements in a specimen, comprising means for scanning the surface of said specimen with impinging electrons to produce fluorescent X-radiations varying in intensity and energy as the surface disposition of said specimen, means for producing from said X-radiations electrical pulses having magnitudes dependent upon the energies of said X-radiation, means for producing from said electrical pulses a plurality of series of control pulses, the number of control pulses per unit time in each series varying with the quantities and positions of said elements, means for providing a multichromatic visual representation of the surface of said specimen, and means for presenting the colors of said visual representation in accordance with the numbers of said control pulses in each of said series thereby to produce a color pattern dependent upon the surface disposition of said specimen indicating the quantities and positions of said elements in the said specimen.

4. A circuit arrangement for determining the quantities and positions of selected elements in a specimen, comprising means for scanning the surface of said specimen with impinging electrons to produce fluorescent X-radiations varying in intensity and energy as the surface disposition of said specimen, energy-sensitive proportional X-ray detecting means in operative proximity to said specimen for producing electrical pulses having magnitudes dependent upon the energies of said X-radiations, means for producing from said electrical pulses a plurality of series of control pulses, the number of control pulses per unit time in each series varying with the quantities and positions of said elements, means for providing a multichromatic visual representation of the surface of said specimen, and means for presenting the colors of said visual representation in accordance with the numbers of said control pulses in each of said series thereby to produce a color pattern dependent upon the surface disposition of said specimen indicating the quantities and positions of said elements in the said specimen.

5. A circuit arrangement for determining the quantities and positions of selected elements in a specimen, comprising means for scanning the surface of said specimen with impinging electrons to produce fluorescent X-radiations varying in intensity and energy as the surface disposition of said specimen, energy-sensitive proportional X-ray detecting means in operative proximity to said specimen for producing electrical pulses having magnitudes dependent upon the energies of said X-radiations, means for producing from said electrical pulses a plurality of series of control pulses, the number of control pulses per unit time in each series varying with the quantities and positions of said elements, means for providing a multichromatic visual representation of the surface of said specimen, means for presenting the colors of said visual representation in accordance with the numbers of said control pulses of each said series thereby to produce a color pattern dependent upon the surface disposition of said specimen indicating the quantities and positions of said elements in the said specimen, said last-mentoned means comprising means for converting the pulse repetition rate of each of said series of control pulses into corresponding signal currents, means for transmitting said signal currents as color television intelligence and means for receiving said color television intelligence and translating it to said signal currents.

6. A circuit arrangement for determining the quantities and positions of selected elements in a specimen, comprising means for scanning the surface of said specimen with impinging electrons to produce fluorescent X-radiations varying in intensity and energy as the surface disposition of said specimen, energy-sensitive proportional X-ray detecting means in operative proximity to said specimen for producing electrical pulses having magnitudes dependent upon the energies of said X-radiations, means for producing from said electrical pulses a plurality of series of control pulses, the number of control pulses per unit time in each series varying with the quantities and positions of said elements, means for providing the quantities and positions of said elements, means for providing a multichromatic visual representation of the surface of said specimen, said last-mentioned means comprising a color television receiving tube having scanning means therein, means for presenting the colors of said visual representation in accordance with the numbers of said control pulses in each said series thereby to produce a color pattern dependent upon the surface disposition of said specimen indicating the quantities and positions of said elements in the said specimen, said last-mentioned means comprising means for converting the pulse repetition rate of each of said series of control pulses into corresponding signal currents, means for transmitting said signal currents as color television intelligence, means for receiving said color television intelligence and translating it to said signal currents, and means for synchronizing said first-mentioned scanning means with said last-mentioned scanning means.

7. A circuit arrangement for determining the quantities and positions of selected elements in a specimen, comprising means for scanning the surface of said specimen with impinging electrons to produce fluorescent X-radiations varying in intensity and energy as the surface disposition of said specimen, energy-sensitive proportional X-ray detecting means in operative proximity to said specimen for producing electrical pulses having magnitudes dependent upon the energies of said X-radiations, means for providing a multichromatic visual representation of the surface of said specimen, and means for presenting the colors of said visual representation in accordance with the magnitudes of said pulses to produce a color pattern dependent upon the surface disposition of said specimen thereby indicating the quantities and positions of said elements in the said specimen.

References Cited in the file of this patent

UNITED STATES PATENTS

| | | |
|---|---|---|
| 2,330,930 | Snyder | Oct. 5, 1943 |
| 2,408,487 | Smith | Oct. 1, 1946 |
| 2,418,029 | Hillier | Mar. 25, 1947 |
| 2,593,925 | Sheldon | Apr. 22, 1952 |
| 2,852,608 | Sziklai | Sept. 16, 1958 |

OTHER REFERENCES

X-Ray Microscopy and Microradiography, by Cosslet, Engstrom and Pattee, Academic Press, Inc., 1957, N.Y. (Proceedings of a Symposium held at the Cavendish Laboratory; Cambridge, England; August 1956.) Pages 374 to 380, incl.

UNITED STATES PATENT OFFICE
CERTIFICATE OF CORRECTION

Patent No. 2,982,814

May 2, 1961

Samuel Fine et al.

It is hereby certified that error appears in the above numbered patent requiring correction and that the said Letters Patent should read as corrected below.

Column 8, lines 2 and 3, strike out "means for providing the quantities and positions of said elements,".

Signed and sealed this 24th day of October 1961.

(SEAL)
Attest:

ERNEST W. SWIDER
Attesting Officer

DAVID L. LADD
Commissioner of Patents

USCOMM-DC